United States Patent [19]

Golla

[11] Patent Number: 4,803,768
[45] Date of Patent: Feb. 14, 1989

[54] METHOD OF, AND APPARATUS FOR, APPLYING SHEET METAL COLLARS ONTO THE NIPPLES OF ANODE BARS

[75] Inventor: Franz Golla, Lunen, Fed. Rep. of Germany

[73] Assignee: Gewerkschaft Eisenhutte Westfalia, Fed. Rep. of Germany

[21] Appl. No.: 15,046

[22] Filed: Feb. 17, 1987

[30] Foreign Application Priority Data

Feb. 21, 1986 [DE] Fed. Rep. of Germany ....... 3605608

[51] Int. Cl.$^4$ .............................................. B23P 17/00
[52] U.S. Cl. ...................................... 29/417; 29/787; 29/809; 72/51; 901/6
[58] Field of Search ..................... 29/7, 417, 787, 809; 72/51; 901/6

[56] References Cited

U.S. PATENT DOCUMENTS

3,626,743 12/1969 Koch ................................. 72/422 X
4,574,458 3/1986 Elsner, Jr. et al. ............... 29/822 X

FOREIGN PATENT DOCUMENTS

0121954 10/1984 European Pat. Off. .
0150680 8/1985 European Pat. Off. .

Primary Examiner—Timothy V. Eley
Assistant Examiner—Frances Chin
Attorney, Agent, or Firm—Samuels, Gauthier, Stevens & Kehoe

[57] ABSTRACT

Collars for surrounding the nipples of an anode bar are produced from a coil of aluminium sheet material. Sheet metal strips are separated from the coil, and are then pre-shaped to substantially U-shaped parts in a bending unit. These U-shaped parts are then pushed over the nipples of the anode bar, and their overlapping ends are fixed to one another by means of a fixing device, to form closed collars.

12 Claims, 3 Drawing Sheets

METHOD OF, AND APPARATUS FOR, APPLYING SHEET METAL COLLARS ONTO THE NIPPLES OF ANODE BARS

BACKGROUND TO THE INVENTION

This invention relates to a method of, and apparatus for, applying collars of aluminium sheet or the like onto the nipples of anode bars projecting from anode blocks.

The carbon anode blocks used for the electrolytic extraction of aluminium are arranged on anode bars. Each anode bar has a so-called spade provided with nipples. The nipples are set in nipple holes in an anode block and are fixed in them, for example by casting (see EP-A No. 150 680). The nipple ends projecting from the nipple holes have to be protected against corrosion and consumption. For this purpose, a strip of aluminium sheet metal, which is bent into a collar shape and is closed by means of a hook fastener, is placed around each of the nipples. The space between each protective collar and its nipple is then filled with a granular composition. In use, the aluminium collars melt away fairly quickly, so that the granulate, which is sintered to a compact protective composition, protects the nipples.

The collars are usually applied by hand, as is the introduction of the granulate, although a mechanical filling device has been proposed for this purpose (see EP-A No. 121 954).

The aim of the invention is to provide a method of, and apparatus for, applying sheet metal collars onto the nipples of anode bars, which enable collars to be positioned mechanically in an economical and reliable manner so that the time-consuming, complicated manual work (which is also unpleasant due to the degassing of the granulate or is even harmful to health), and was formerly necessary, can be dispensed with.

SUMMARY OF THE INVENTION

The present inventio provides a method of applying collars of sheet metal onto the nipples of anode bars, the method comprising the steps of unwinding sheet metal from a coil, separating strips from the sheet metal, bending the strips into collar-shaped parts, and subsequently placing each of said parts around a respective bar nipple and then closing that part to form a finished collar.

With this mode of operation, it is possible to produce collars mechanically form a coil of light sheet metal, and to place them around the nipple of anode bars in a rapid and reliable manner, and therefore with high throughputs, while avoiding the formerly required manual work and the high operating costs caused thereby. With this mode of operation, each collar is produced and positioned in two consecutive stages, each collar-shaped part initially being bent from a sheet metal strip, and the shaped part then being brought into position around the associated nipple, being closed to form a collar and being fixed in this form.

Advantageously, the method further comprises the step of fixing the overlapping ends of each of said parts. This can be carried out in a simple manner using a tacker, but also with the aid of other fixing devices such as riveting devices, spot welding devices or binding devices. A particularly simple and desirable mode of operation results is each of said parts is bent into a collar-shaped form, that part is widened elastically into a generally U-shaped form, prior to being placed onto the .associated nipple, and then closed to form the finished collar. In this case, a gripper can be used to widen said parts, and for conveying and positioning said parts at the same time.

The invention also provides apparatus for applying sheet metal collars onto the nipples of anode bars, the apparatus comprising a winder for unwinding a sheet metal band from a coil, a cutting unit for cutting strips of predetermined length from the metal band, a bending unit for bending the strips into collar-shaped parts, and a closure unit for closing said parts around the nipples to form closed collars.

Advantageously, the apparatus further comprises a set of drive rollers for feeding separated sheet metal strips to the bending unit, the set of drive rollers being downstream of the cutting ;unit.

Preferably, the bending unit is mounted in a machine frame, and the bending unit is constituted by a bending station and a collar laying station, and wherein a transfer device is provided for conveying said parts from the bending station to the collar laying station. Alternatively, the bending and laying operations can be carried out jointly at the collar laying station.

Advantageously, the bending unit is orientated in the machine frame in such a way that said parts bent in it point with their profile opening towards the collar laying station.

The apparatus may further comprise a conveyor for conveying anode bars in succession through the collar laying station. Preferably, the conveyor is a roller conveyor.

In a preferred embodiment, the transfer device is provided with a gripper having gripper jaws which are movable towards one another. Preferably, each of the gripper jaws is provided with a movable finger. This arrangement enables said shaped parts to be widened to approximately U-shaped configurations, and so facilitates application to the nipples.

Advantageously, the transfer device has a carriage with a carriage drive, the carriage being guide above the bending unit in the machine frame, and bearing the gripper which can be raised and lowered by a lifting device. Preferably, the carriage is movable to and fro, transversely to the direction of movement of the conveyor, between the bending station and the collar laying station.

The closure unit may have a fixing device for fixing the overlapping ends of said collar-shaped parts thereby to form closed collars. Conveniently, the fixing device is a tacker. Preferably, the fixing device is arranged on the side of the conveying direction opposite the carriage.

Advantageously, the cutting unit is preceded by a sheet metal straightening unit provided with straightening rollers.

The space between the collars and the nipples can be filled in a subsequent filling device. Preferably, however, the apparatus further comprises a device for filling the spaces between the collars and the nipples, said device being arranged in the conveying path of the conveyor in the region of the collar laying station.

BRIEF DESCRIPTION OF THE DRAWINGS

The invention will now be described in more detail, by way of example, with reference to the accompanying drawings, in which.

DESCRIPTION OF PREFERRED EMBODIMENT

Figure 1:
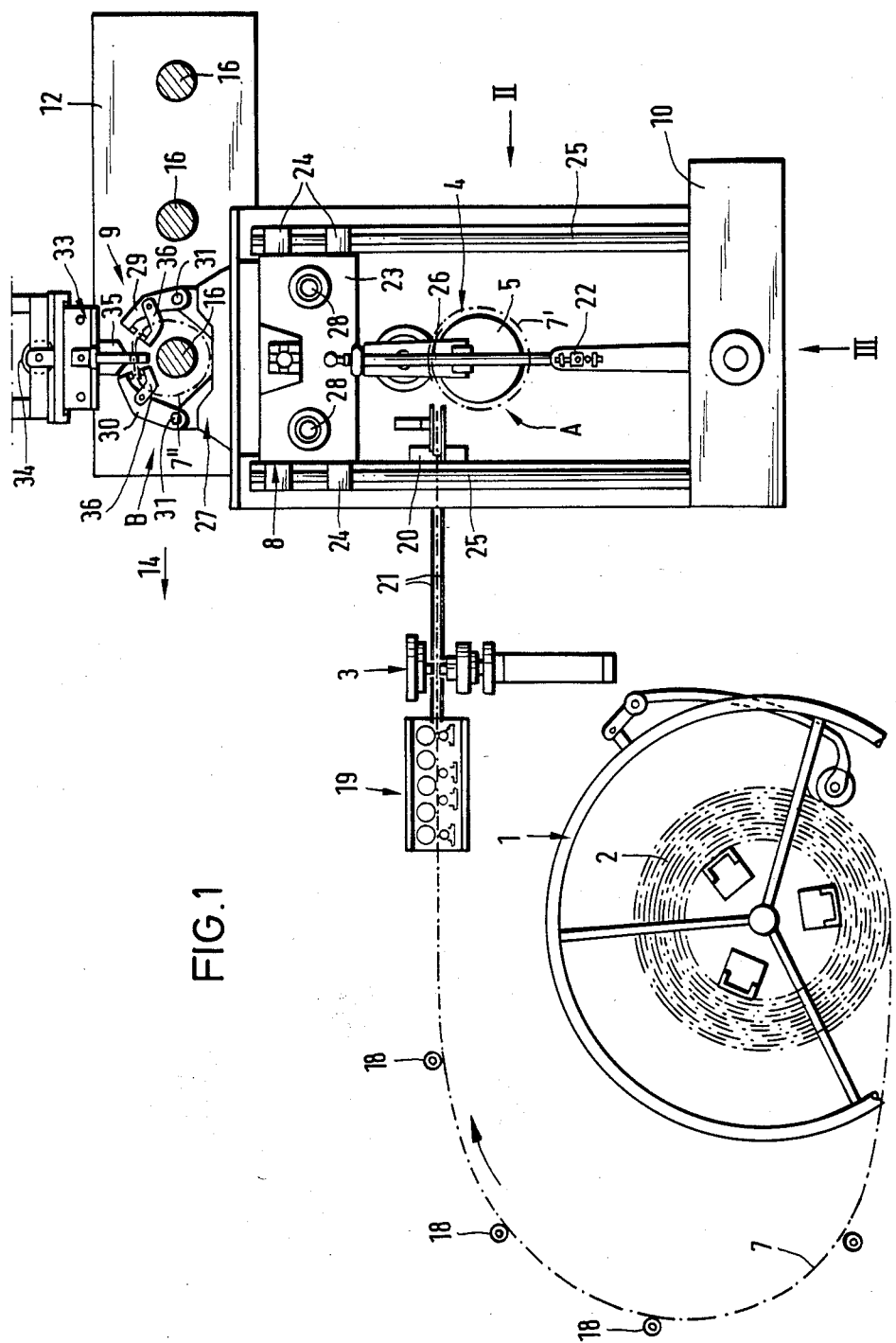
FIG. 1 is a plan view of apparatus constructed in accordance with the invention.

Referring to the drawings, the collar mounting apparatus of the invention essentially comprises a winder 1, a cutting unit 3, and bending unit 4, a transfer device 8 and a closure device 9, all these parts being mounted on a common machine frame 10. The winder 1 holds a coil 2 of sheet aluminium, and the cutting unit 3 is arranged to cut off strips of predetermined length from the band 7 which is unwound from the coil 2. The bending unit 4 has a bending station A and a collar laying station B, the bending station including a drive motor 6 for bending each of the separated strips into an approximately annular shaped part 7', indicated in dot-dash lines in FIG. 1. The transfer device 8 is used to convey the parts 7' from the bending station A to the collar laying station B. The closure device 9 is used to close each of the shaped parts 7' into a collar (indicated by the reference numeral 7" in FIG. 1) which surrounds a nipple of an anode bar 11.

Anode bars 11, whose nipples 16 are to be provided with protective collars, with the anode blocks 12 arranged thereon, are conveyed through the collar laying station B in succession in the direction of the arrow 14 (see FIG. 1) by means of a conveyor 13 (see FIG. 2), which is, for example, a roller conveyor. The conveyor 13 is indicated only schematically in FIG. 2, and is omitted from FIGS. 1 and 3 for reasons of clarity.

Each of the anode bars 11 has, at its lower end, a so-called spade 15 (see FIGS. 2 and 3), which is provided with three parallel nipples, 16. These nipples 16 fit into nipple holes provided in the associated anode block 12, where they are fixed, for example by pouring in molten metal. The parts of the nipples 16 projecting upwardly from the nipple openings of the anode block 12 must be protected from corrosion, and this is effected by placing collars 7" around these parts of the nipples 16, whereafter the annular spaces between the nipples and the collars are filled with a granular composition. During operation, this granular commposition melts under the action of heat, and sinters to form a closed protective mass.

Figure 2:
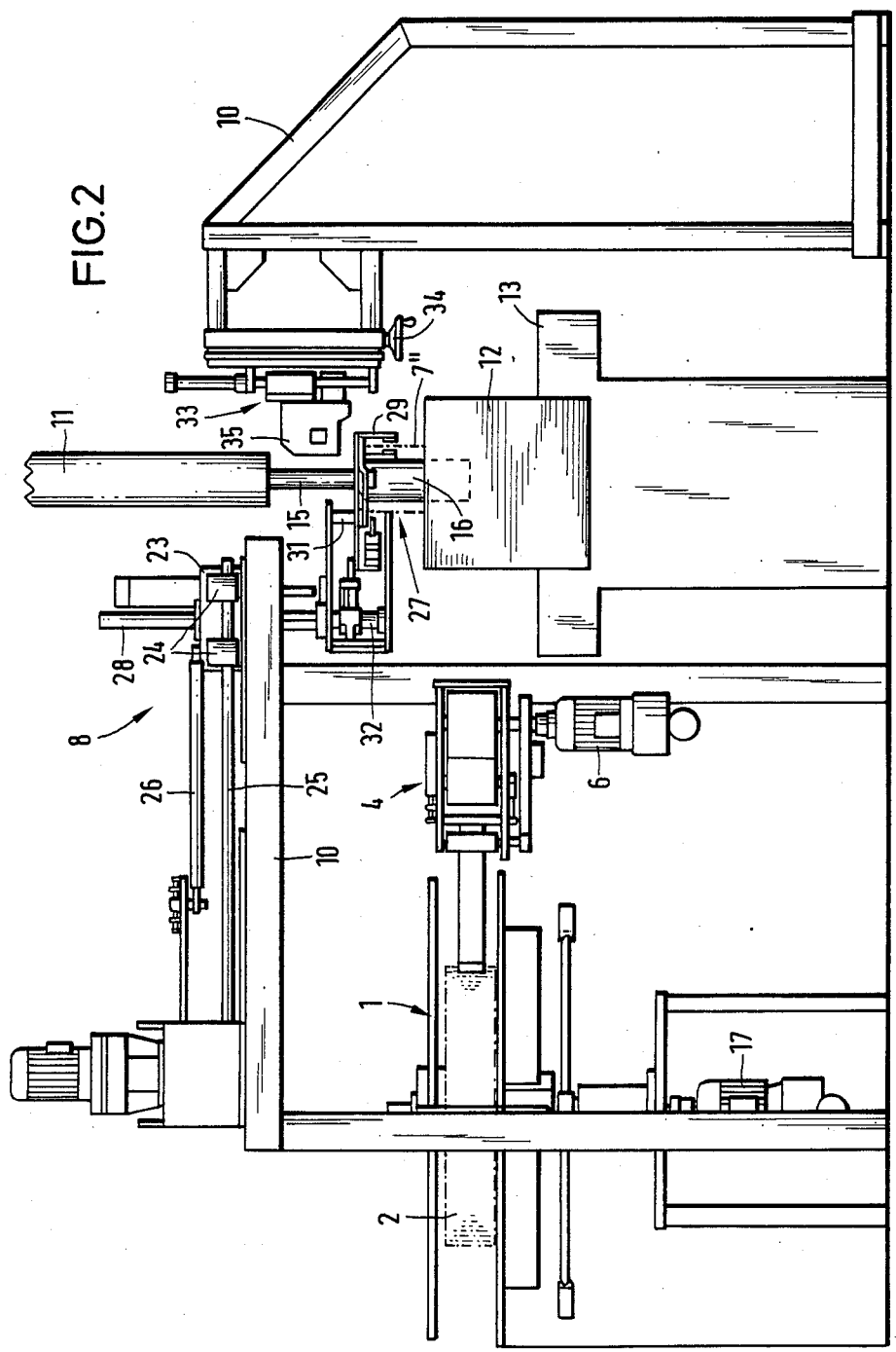
FIG. 2 is a side view of the apparatus of FIG. 1 looking in the direction of the arrow II of FIG. 1.
Figure 3:
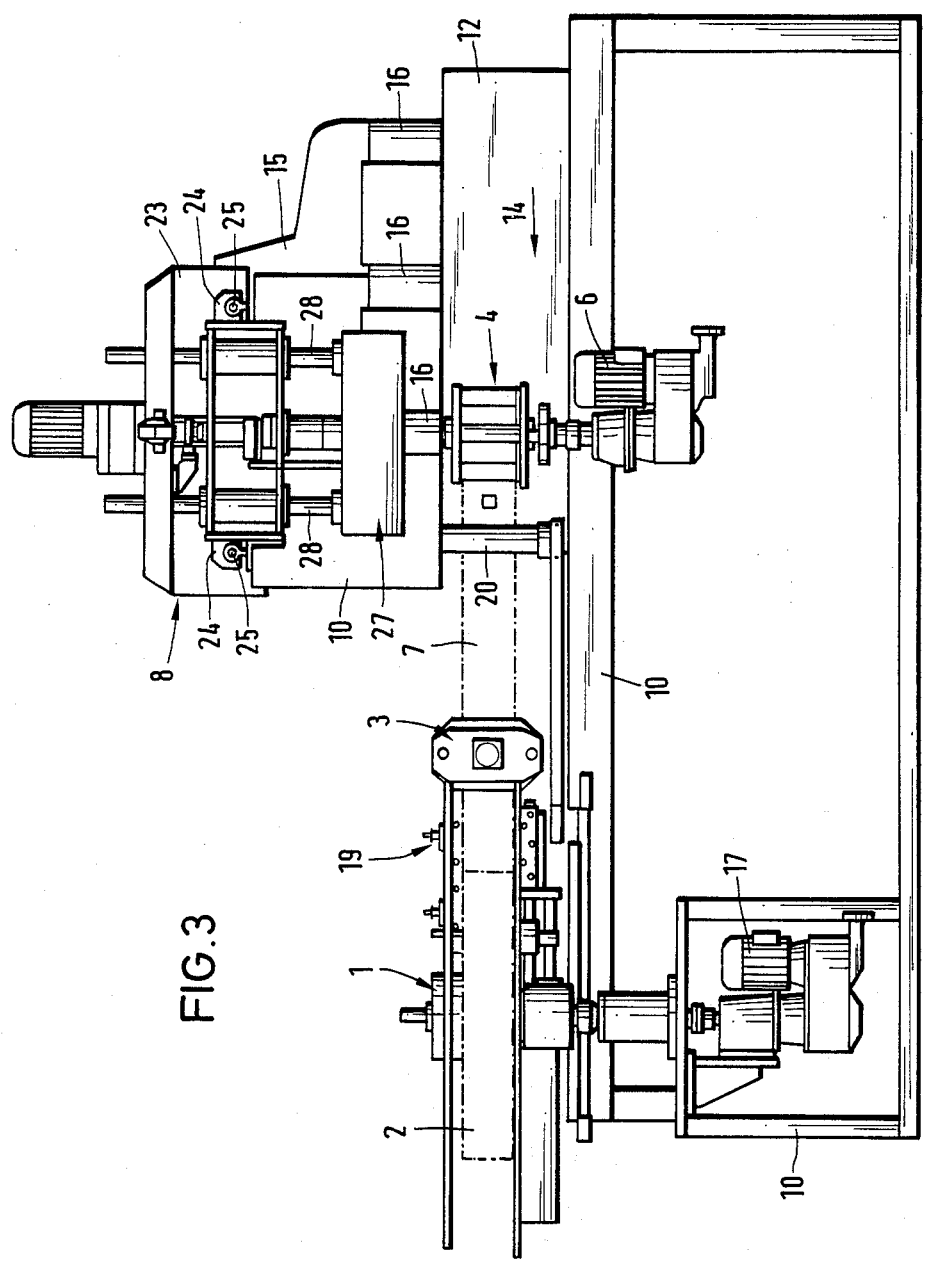
FIG. 3 is a front view of the apparatus of FIGS. 1 and 2 looking in the direction of the arrow III of FIG. 1.

As shown in FIGS. 2 and 3, a drive motor 17 is provided for unwinding the aluminium band 7 from the coil 2, the motor 17 being mounted beneath the winder 1 in the machine frame 10. The issuing aluminium band 7 is guided along a curved path (see FIG. 1) by guide rollers 18. It passes through a straightening unit 19 provided with straightening rollers, and is severed transversely downstream of the straightening unit 19 by the cutting unit 3. The cutting unit 3 separates individual metal strips of a predetermined length from the metal band 7, from which the individual collars 7" are shaped. A set of drive rollers 20, which draws the metal band 7 through the straightening device 19 and the cutting unit 3 and supplies the separated metal strips to the bending station A, is arranged between the cutting unit 3 and the bending unit 4. In the region between the straightening unit 19 and the bending station A, the metal band 7 is guided by a gap between two closely-superimposed guide plates 21. The guide plates 21 each have an opening through which can pass the blade of the cutting unit 3.

The bending unit 4 can be of conventional construction, and so this unit will not be described in detail. The bending unit 4 is arranged in the machine frame 10 is such a way that the metal strips separated from the metal band 7 by means of the cutting unit 3 are bent into the approximately annular shaped parts 7' whose open ends overlap, the overlapping region pointing towards the collar laying station B (see FIG. 1). The bending unit 4 can be orientated accurately in the machine frame 10 by means of a positioning unit 22.

The transfer device 8 comprises a carriage 23 which is guided, by means of guide members 24, on carriage guides 25. The guides 25 are arranged above the common plane of the bending unit 4, the cutting unit 3 and the sheet metal coil 2 in the machine frame 10. The carriage 23 is consequently movable to and fro between the two stations A and B, at right-angles to the direction 14 in which the anode bars 11 are conveyed. At least one hydraulic arm 26 is provided as carriage drive means. A gripper 27 is mounted beneath the carriage 23, the gripper being vertically movable relative to the carriage by means of lifting devices (hydraulic rams) 28. It is advisable, simultaneously to guide the gripper 27 in vertical guides provided on the carriage.

The closure device 9 forms a structural unit with the gripper 27. The gripper 27 has two jaws 29 and 30 which can move towards one another. The gripper jaws 29 and 30 can be pivoted in opposite directions to one another, in the manner of pliers, about vertical axes 31 by means of a pivot drive means 32. Each gripper jaw 29 and 30 has a finger 36 arranged pivotally on it.

A fixing device 33 (which forms part of the closure device 9) is adjustably mounted, by means of an adjusting device 34, on the machine frame 10 at the collar laying station B. The overlapping edges of the collars 7" surrounding the nipples 16 are fixed together by means of this fixing device 33. The fixing device 33 is located on the side of the anode bar conveying track opposite the carriage 23.

The apparatus described above can operate automatically. At the beginning, the aluminium band 7 is unwound, by the winder 1, from the coil 2 until its free end can be introduced into the set of drive rollers 20. During operation, the individual strips are separated in a predetermined sequence from the aluminium band 7, and the strips are subsequently supplied to the bending unit 4. In the bending unit 4, the strips are bent to form the shaped parts 7'. They are then conveyed, by means of the transfer device 8, from the bending station A to the collar laying station B. For this purpose, the carriage 23 travels to the bending station A, whereupon the gripper 27 is lowered to the bending unit 4 by means of the lifting devices 28 so that its jaws 29 and 30 and the fingers 36 grip a shaped part 7' at the bending station. The gripper 27 is then raised together with that shaped part 7', and the carriage 23 is driven towards the collar laying station B, that is to say into the position shown in FIG. 1, where the gripper is re-lowered using the lifting devices 28. As shown in FIG. 1, the fingers 36, which are actuated by small finger drives (not shown), fit into the annular shaped part 7', the shaped part 7' being held on both sides of its overlapping ends between the plier-like parts formed by the fingers 36 and the ends of the jaws 29 and 30. Thus, but pivoting the gripper jaws 29 and 30 about their axes 31, the shaped part 7' can be opened up to form an approximately U-shaped configuration. The part 7' is then pushed in this form, from the side, over a respective nipple 16 of an anode bar 11, the anode bar being orientated precisely relative to the gripper 27 by means of the conveyor 13. The shaped part 7' is then released by the gripper 27, so that the shaped part closes under its elastic restoring force to form a closed collar 7" whose ends overlap. The overlapping ends of the shaped part are then fixed together by means of the fixing device 33, thereby to finish the collar 7". The fixing device 33 preferably comprises a tacker 35 which pins together the overlapping sheet ends. Instead of a tacker 35, other known fixing devices can also be provided. The gripper 27 is then raised again, after the gripper jaws 29 and 30 are opened, whereupon the carriage 23 returns to the bending station A to pick up a new shaped part 7'. Meanwhile, the anode bar 11 (together with the anode block 12) is advanced, by means of the conveyor 13, until the next nipple 16 lies in the collar laying station B. This nipple is then equipped with a collar 7" in the same manner. The entire apparatus can be operated automatically, by pre-determining the working movements of the various devices.

It will be apparent that the apparatus described above would be modified in a number of ways. For example, it could be arranged in such a way that approximately U-shaped parts 7' are initially produced by means of the bending unit 4. In this case, the U-shaped part 7' would be placed around the nipples 16 in the manner described, and then closed round the nipples and fixed in the ring shape. Moreover, the closure of a U-shaped part to form an annular collar could also be carried out by the gripper itself.

I claim:

1. Apparatus for applying sheet metal collars onto the nipples of anode bars, the apparatus comprising means for unwinding a sheet metal band from a coil, a cutting unit for cutting strips of predetermined length from the metal band, a bending unit mounted in a machine frame for bending the strips into collar-shaped parts, a collar laying station, a transfer device for conveying said parts to said collar laying station, said transfer device being provided with a gripper having gripper jaws which are movable towards one another, said gripper jaws each having a movable finger, and a closure unit at said collar laying station for closing said parts around the nipples to form closed collars.

2. Apparatus according to claim 1, further comprising a set of drive rollers for feeding separated sheet metal strips to the bending unit, the set of drive rollers being downstream of the cutting unit.

3. Apparatus according to claim 1, wherein the bending unit is orientated in the machine frame in such a way that said parts have overlapping regions pointing towards the collar layer station.

4. Apparatus according to claim 1, further comprising a conveyor for conveying anode bars in succession through the collar laying station.

5. Apparatus according to claim 4, wherein the conveyor is a roller conveyor.

6. Apparatus according to claim 4 wherein spaces exist between the collars and the nipples, and further comprising a device for filling said space, said device being arranged in the conveying path of the conveyor in the region of the collar laying station.

7. Apparatus according to claim 1, wherein the transfer device has a carriage with a carriage drive, the carriage being guided above the bending unit in the machine frame, and bearing the gripper which can be raised and lowered by a lifting device.

8. Apparatus according to claim 7, wherein the carriage is movable to and fro, transversely to the direction of movement of the conveyor, between the bending station and the collar laying station.

9. Apparatus according to claim 7, wherein the closure unit has a fixing device for fixing the overlapping ends of said collar-shaped parts thereby to form closed collars.

10. Apparatus according to claim 9, wherein the fixing device is a tacker.

11. Apparatus according to claim 9, wherein the fixing device is arranged on the side of the conveying direction opposite the carriage.

12. Apparatus according to claim 1, wherein the cutting unit is preceded by a sheet metal straightening unit provided with straightening rollers.

* * * * *